(12) United States Patent
Prevost

(10) Patent No.: US 11,118,616 B2
(45) Date of Patent: Sep. 14, 2021

(54) VIBRATION ISOLATOR FOR TURNLOCK FASTENERS

(71) Applicant: Christopher Prevost, Sonoma, CA (US)

(72) Inventor: Christopher Prevost, Sonoma, CA (US)

( * ) Notice: Subject to any disclaimer, the term of this patent is extended or adjusted under 35 U.S.C. 154(b) by 69 days.

(21) Appl. No.: 16/733,425

(22) Filed: Jan. 3, 2020

(65) Prior Publication Data

US 2020/0149568 A1 May 14, 2020

Related U.S. Application Data

(63) Continuation-in-part of application No. 15/598,380, filed on May 18, 2017, now Pat. No. 10,527,084.

(60) Provisional application No. 62/338,820, filed on May 19, 2016.

(51) Int. Cl.
*F16B 5/10* (2006.01)
*F16B 21/04* (2006.01)
*F16B 43/00* (2006.01)

(52) U.S. Cl.
CPC .............. *F16B 5/10* (2013.01); *F16B 21/04* (2013.01); *F16B 43/001* (2013.01)

(58) Field of Classification Search
CPC .......... F16B 5/10; F16B 21/04; F16B 33/004; F16B 43/00; F16B 43/001; F16L 5/10
USPC .......... 411/368–370, 371.1–371.2, 517, 531, 411/542, 546; 16/2.2
See application file for complete search history.

(56) References Cited

U.S. PATENT DOCUMENTS

| | | | |
|---|---|---|---|
| 1,955,740 A | 4/1934 | Dzus | |
| 2,030,088 A * | 2/1936 | Young | F16B 43/00 411/371.2 |
| 2,560,092 A | 7/1951 | De La Mater | |
| 2,761,347 A * | 9/1956 | McKee, Jr. | F16B 43/001 411/371.1 |
| 2,882,073 A | 4/1959 | James | |
| 2,893,722 A | 7/1959 | Beck | |
| 2,982,573 A * | 5/1961 | McKee, Jr. | F16B 43/001 411/542 |
| 2,983,534 A * | 5/1961 | Heller | F16B 43/001 411/542 |
| 3,286,577 A * | 11/1966 | Weidner, Jr. | F16J 15/12 411/542 |

(Continued)

OTHER PUBLICATIONS

Cable organizer.com, Rubber Grommet, http://wwwcableorganizer.com/grommet/, Apr. 22, 2016, 1 page.

(Continued)

*Primary Examiner* — Roberta S Delisle
(74) *Attorney, Agent, or Firm* — Finch & Maloney PLLC

(57) ABSTRACT

Disclosed is a vibration isolator for use with a turnlock fastener. The isolator includes a body portion with a generally cylindrical shape and defining a through opening along a central axis. A flange portion is connected to and extends radially outward from the bottom end portion of the body portion such that the body portion extends upward from the flange portion. In some embodiments the isolator is part of an assembly that also includes an annular body defining a central opening, such as a flat or frustoconical annulus. Components of the vibration isolator can be made of an elastomeric material having a durometer of at least 40 A. A method of installing a turnlock fastener is also disclosed.

20 Claims, 12 Drawing Sheets

(56) References Cited

U.S. PATENT DOCUMENTS

| | | | |
|---|---|---|---|
| 3,350,042 A | 10/1967 | Stewart et al. | |
| 3,500,712 A * | 3/1970 | Wagner | F16B 43/001 411/371.1 |
| 3,588,133 A * | 6/1971 | Caserta | F16B 43/001 411/542 |
| 3,606,357 A * | 9/1971 | Yonkers | F16B 43/001 411/537 |
| 3,661,046 A | 5/1972 | Waud et al. | |
| 3,756,551 A | 9/1973 | Bishop | |
| 4,066,058 A | 1/1978 | Anderkay | |
| 4,072,245 A | 2/1978 | Sloan, Jr. | |
| 4,522,378 A | 6/1985 | Nelson | |
| 4,534,545 A | 8/1985 | Fannin et al. | |
| 4,712,802 A * | 12/1987 | Hewison | F16B 43/001 411/542 |
| 5,052,699 A | 10/1991 | Tucker | |
| 5,165,687 A | 11/1992 | Soong | |
| 5,238,233 A | 8/1993 | Hein | |
| 5,304,037 A | 4/1994 | Scofield | |
| 5,310,276 A | 5/1994 | Bergers et al. | |
| 5,765,819 A | 6/1998 | Hummel | |
| 5,791,637 A | 8/1998 | Reichelt et al. | |
| 6,088,874 A | 7/2000 | Nakata et al. | |
| 6,088,876 A | 7/2000 | Daoud | |
| 6,115,259 A | 9/2000 | Karner | |
| 6,227,784 B1 | 5/2001 | Antoine et al. | |
| 6,290,238 B1 | 9/2001 | Johnson, Jr. | |
| 6,354,558 B1 | 3/2002 | Li | |
| 7,284,748 B2 | 10/2007 | Mishima | |
| 7,311,493 B2 * | 12/2007 | Remy | F16B 43/001 277/593 |
| 7,712,730 B2 | 5/2010 | Fabrizio | |
| 7,740,433 B2 | 6/2010 | Miyoshi et al. | |
| 8,152,146 B2 | 4/2012 | Rodecker | |
| 8,622,376 B2 | 7/2014 | Lavigne | |
| 10,527,084 B2 * | 1/2020 | Prevost | F16B 43/001 |
| 2013/0259600 A1 * | 10/2013 | Kerechanin, II | F16B 5/0216 411/368 |
| 2017/0335880 A1 | 11/2017 | Prevost | |

OTHER PUBLICATIONS

Lawson Products, Bonded Sealing Washer 18-8 Stainless Steel (Apr. 4, 2016), 1 page.

RaceReady Products, DZUS Fasteners Image, available at http://www.racereadyproducts.com/body-panel-fastners/dzus-fasteners/, (admitted prior art).

Columbia Air Motive, DZUS Standard Line Fasteners, available at http://www.columbiaairmotive.com/StartQuery.php?Id=DZUS_Fasteners&display_cat=True, (Apr. 22, 2016).

Aviation Maintenance Technician Handbook, DZUX Fasteners, Fig. 5-58, available at http://aystop.com/ac/Aviation_Maintenance_Technician_Handbook_General/5-66.html, (admitted prior art).

AvStop.com webpage, Turnlock Fasteners, available at http://avstop.com/ac/apgeneral/turnlockfasteners.html, (Feb. 10, 2016).

* cited by examiner

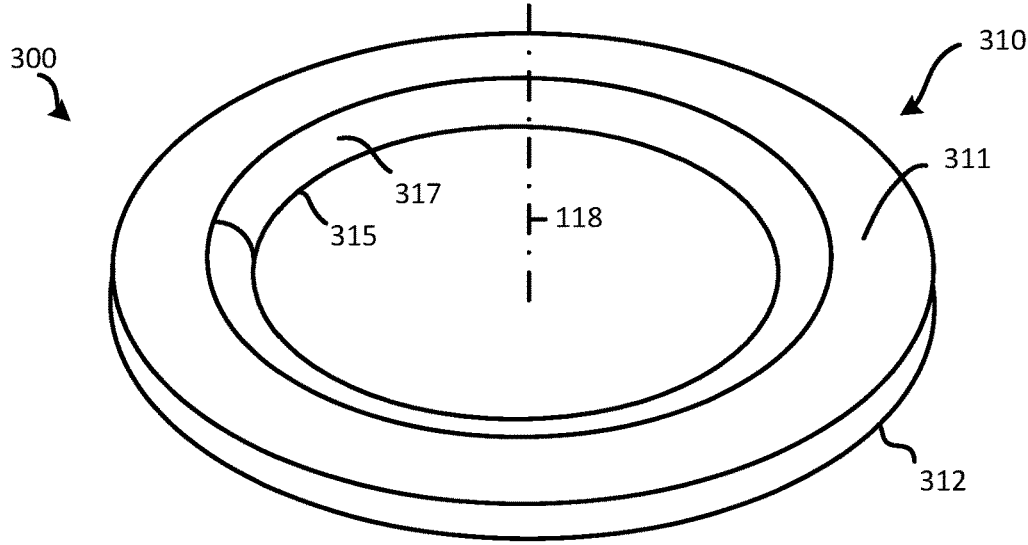
FIG. 9A
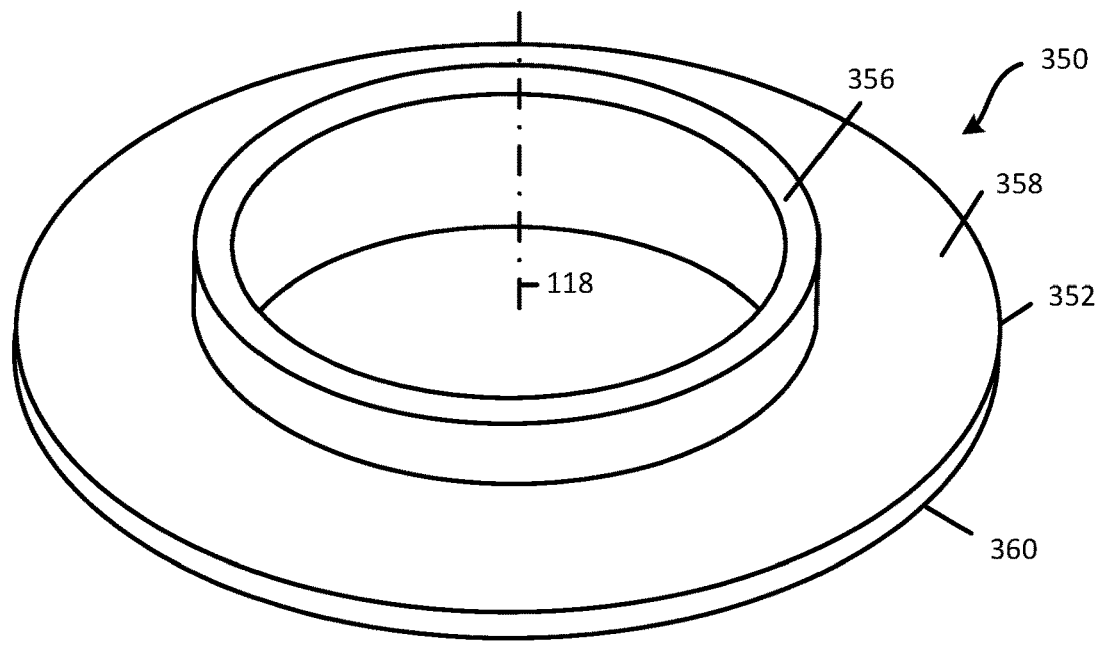
FIG. 9B
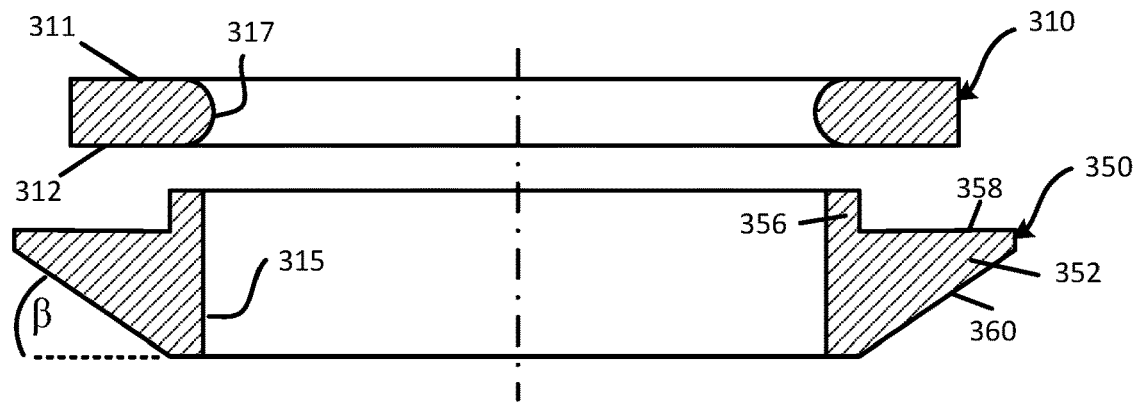

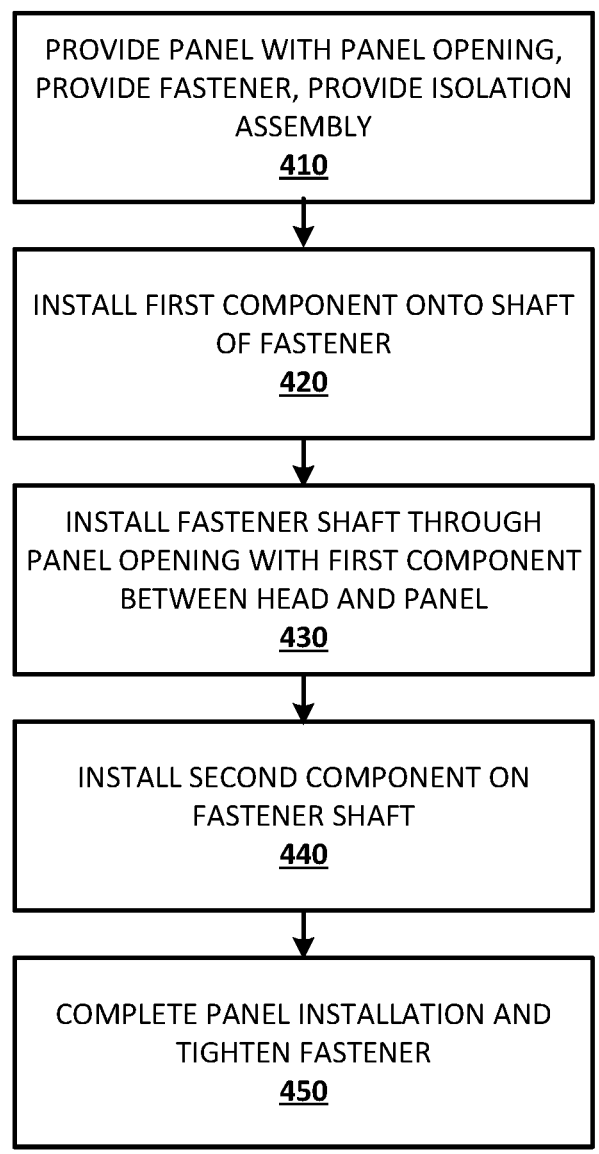

VIBRATION ISOLATOR FOR TURNLOCK FASTENERS

RELATED APPLICATIONS

This application is a continuation-in-part application of U.S. patent application Ser. No. 15/598,380, filed on May 18, 2017 and titled ELASTOMERIC COLLAR FOR FASTENERS, and which claims the benefit of U.S. Provisional Patent Application No. 62/388,802 filed on May 19, 2016. Each of these applications is herein incorporated by reference in its entirety.

BACKGROUND

Field of the Invention

The present invention relates generally to fasteners and washers. Particularly, the present disclosure relates to an elastomeric collar and a vibration dampening system for turnlock fasteners.

Description of the Prior Art

Turnlock fasteners are used to secure inspection plates, doors, and removable panels on aircraft, refrigeration equipment, marine vessels, electronics, automotive, and industrial equipment. Turnlock fasteners are also known as quick-opening fasteners, quick-action fasteners, and stressed-panel fasteners. Various manufacturers and trade names are associated with these fasteners, such as Dzus®, Camloc®, and Airloc®. Turnlock fasteners lock after ¼ turn and therefore permit quick and easy removal of access panels for inspection and service purposes while also preventing unintentional loosening or removal of the fastener. The Dzus® fasteners have an "over-center" design that requires positive sustained torque to unfasten. As a result, vibration and minor disturbances to the fastener tend to self-correct rather than further loosen as occurs with threaded fasteners.

The Dzus® fastener is described in U.S. Pat. No. 1,955,740 to William Dzus. Two panels can be quickly fastened together by bringing the panels together with holes aligned. The bottom or inside panel has a wire connector extending across the hole. The shank of the button is placed into the hole of the top or outside panel, and then the button is turned to a position where slots in the shaft will hold the wire connector. As the button turns, the walls of its spiral slots act as cams, and pull the intermediate section of the wire connector from its relaxed position up into the slot's holes past the slot's projections, thereby drawing the top or outer panel towards the lower or inner panel. The projection in the slots resists reverse rotation of the button and thus prevents unintentional separation of the two panels due to vibration. Optionally, to prevent noise, strips of felt may be placed between the two panels. The buttons are typically made of steel and have a flush head, oval head, or wing head.

Washers of the prior art for turn-lock fasteners have the shape of a coned-disc spring washer and are made of aluminum. These washers are known as the Belleville washer. The conical shape of the washer engages a sloped bottom face of the fastener head. This type of washer results in a tighter fit between the fastener head and the outer panel.

SUMMARY

Although turnlock fasteners have been widely accepted for securing panels together, the fasteners have deficiencies. When used on aircraft, turnlock fasteners allow enough movement between the panel and the fastener head to result in wear to the outer panel. Vibration and movement at the fastener can result in wear to an aircraft cowling. After about 1000 hours of flight, the wear to the cowling may be severe enough to warrant replacement. With a cost of about $100,000 for some cowlings, replacement is an undesirable expense, especially when the remainder of the cowling is in serviceable condition.

Another deficiency of turnlock fasteners is that the fastener does not provide a water-tight seal with the panel when fastened. As such, water, oil, and other fluids can leak between the panels and the fastener, leading to corrosion and a tarnished appearance.

Accordingly, a need exists for a fastener collar that alleviates the deficiencies of prior-art turnlock fasteners and washers. Accordingly, it is desirable to provide a fastener collar that reduces wear to panels held together by fasteners, such as turnlock fasteners. It is also desirable to isolate a turnlock fastener from a panel through which it is attached.

An elastomeric collar in accordance with this disclosure is intended for use with turnlock fasteners and other fasteners. One embodiment of an elastomeric fastener collar has a body portion generally having a hollow cylindrical shape extending along a central axis and defining a through-opening along the central axis. The body portion has an upper body end portion, a lower body end portion, an inside body surface, and an outside body surface. A first annular flange is continuous with and extends radially outward from the upper body end portion. The first annular flange has a first flange top surface and a first flange bottom surface. A second annular flange is continuous with and extends radially outward from the lower body end portion. The second annular flange has a second flange top surface and a second flange bottom surface, where the second annular flange is axially spaced by a gap from the first annular flange. The body portion, the first annular flange, and the second annular flange comprise a single monolithic structure made of an elastomer having a durometer of at least 40 A.

In another embodiment, the elastomer has a durometer of at least 60 A or at least 95 A. In some embodiments, the elastomer is polyurethane, butadiene, natural rubber, or nylon.

In another embodiment, the body portion has an annular protrusion extending radially inward from the inside body surface. In some embodiments, the annular protrusion has a rounded profile. In some embodiments, the annular protrusion extends from the inside body surface of the upper end portion. In other embodiments, the annular protrusion extends from the inside body surface of the lower end portion.

In another embodiment, the first flange bottom surface and the second flange top surface each extend from the body portion in parallel at an angle of 55-60° with respect to the central axis. For example, when the central axis is vertically oriented, the first flange bottom surface and the second flange top surface each extends upward to define an angle of 55-60° with the central axis.

In some embodiments, at least two of the first flange top surface, the first flange bottom surface, the second flange top surface, and the second flange bottom surface are inclined with respect to the central axis, such as defining an angle of 30-45°, 45-55°, 55-60°, or 60-70° with the central axis.

In some embodiments, the first annular flange is at least partially nested within the second annular flange. In some embodiments, for example, the top-most surface of the first flange is substantially coplanar with the top-most surface of the second flange.

In some embodiments, the gap between the first and second flanges is from about 0.2 to about 0.6 inch.

In some embodiments, at least one of the first flange top surface and the second flange bottom surface is perpendicular to the central axis.

In some embodiments, the first flange top surface and/or the second flange bottom surface is substantially parallel to the second flange top surface. For example, these surfaces all define an angle that is within about 3 degrees of each other.

In some embodiments, the second flange bottom surface is parallel to the second flange top surface. In other embodiments, at least two of the first flange top surface, the first flange bottom surface, the second flange top surface, and the second flange bottom surface extend from the body portion in parallel.

In another aspect of the present invention, a fastener collar has a body portion generally having a hollow cylindrical shape extending along a central axis and defining a through-opening along the central axis. The body portion has an upper body end portion with an upper body end, a lower body end portion with a lower body end, an inside body surface, and an outside body surface. An annular protrusion with a rounded profile extends radially inward from the inside body surface of the upper body end portion. A first annular flange is continuous with and extends radially outward from the upper body end portion, where the first annular flange has a first flange top surface and a first flange bottom surface. A second annular flange is continuous with and extends radially outward from the lower body end portion, where the second annular flange has a second flange top surface and a second flange bottom surface, and where the second annular flange is axially spaced by a gap from the first annular flange. The body portion, the first annular flange, the second annular flange comprise a single monolithic structure made of an elastomer having a durometer of at least 60. At least one of the first flange top surface, the first flange bottom surface, the second flange top surface, and the second flange bottom surface is inclined with respect to the central axis.

In other embodiments, at least two of the first flange top surface, the first flange bottom surface, the second flange top surface, and the second flange bottom surface are inclined at an angle of 55-60° with respect to the central axis. Other angles of inclination are also acceptable as noted above. In some embodiments, for example, at least two of the first flange top surface, the first flange bottom surface, the second flange top surface, and the second flange bottom surface extend from the body portion in parallel.

In some embodiments, at least one of the first flange top surface and second flange bottom surface is perpendicular to the central axis.

In other embodiments, the first flange bottom surface is substantially parallel to the second flange top surface. In other embodiments, the body portion, first flange, and/or second flange have a shape other than circular, such as oblong, rectangular.

In another aspect of the present disclosure, a vibration isolator for a turnlock fastener can be a two-piece assembly. In one such embodiment, the first component is an annular body defining a central opening sized to receive the shaft of a turnlock fastener. The second component includes a generally cylindrical body with an annular flange connected to and extending radially outward from the bottom portion of the body, where the body extends axially upward from the flange portion. The first and second components can have the geometries and materials as variously discussed above for the one-piece collar.

When installed, for example, the first component (including the first annular flange) can be installed on the fastener against the fastener head prior to installing the fastener in the panel to be assembled. After inserting the fastener shaft through the panel opening, the second component (with the second annular flange and body) can be installed on the fastener shaft with the body extending towards the fastener head and into the panel opening. The panel can then be assembled with a second panel or bracket having the wire connector portion of the turnlock fastener. For example, the panel is placed against the second panel or bracket with the fastener shaft positioned to engage the wire connector. Turning the fastener engages the wire and draws the panel against the second panel or bracket, as will be appreciated.

Another aspect of the present disclosure is a vibration isolation assembly for use with a turnlock fastener. In one embodiment, the assembly includes a first component and a second component. The first component is made of a first elastomer and has an annular body with a first top surface and a first bottom surface. The annular body defines a central opening sized for a shaft of a turnlock fastener. The second component is made of a second elastomer and includes a hollow cylindrical body portion extending along a central axis and defining a through-opening along the central axis and sized for the shaft of the turnlock fastener. The body has an upper body end portion and a lower body end portion. An annular flange is continuous with and extends radially outward from the lower body end portion. The annular flange has a flange top surface and a flange bottom surface, where the flange bottom surface and the flange top surface each extend radially outward from the body portion in parallel at an angle of 45-70° with respect to the central axis. The first elastomer and the second elastomer each have a durometer of at least 40 A, and wherein the first component and the second component are sized for installation on the shaft of the turnlock fastener.

In some embodiments, the second component includes an annular protrusion extending radially inward from an inside of the body portion. For example, the annular protrusion is located on the upper body end portion.

In some embodiments, the body portion has an axial height from 0.2 to 0.6 inch.

In some embodiments, the durometer is at least 95 A.

In some embodiments, the first elastomer and the second elastomer are selected from polyurethane, butadiene, and nylon. In some embodiments, the first elastomer and the second elastomer are compositionally distinct. In another embodiment, the first elastomer has a first durometer and the second elastomer has a second durometer different from the first durometer.

In some embodiments, a radially inside surface of the first component has a rounded profile.

In some embodiments, the first top surface and the first bottom surface each define an angle of 50-70 degrees with an axis of the central opening. In other embodiments, the angle is 55-60°.

In some embodiments, the upper body end portion of the second component is sized and constructed for a slip fit with the first component.

In other embodiments, the upper body end portion of the second component is sized and constructed for a snap fit with the first component.

Another aspect of the present disclosure is a vibration isolator for use with a turnlock fastener. In one embodiment, the isolator comprises a body generally having a hollow cylindrical shape extending along a central axis and defining a through-opening along the central axis. The body has an upper body end portion and a lower body end portion. The through-opening is sized to receive a shaft of a turnlock fastener. An annular flange extending radially outward from the lower body end portion, the annular flange having a flange top surface and a flange bottom surface, where the flange bottom surface and the flange top surface extend generally in parallel upward and radially outward from the lower body end portion at an angle from 50 to 70° with respect to the central axis. The body and the annular flange comprise a single monolithic structure made of an elastomer having a Shore-A hardness of at least 60.

In some embodiments, the body includes an annular protrusion with a rounded profile that extends radially inward from an inside of the upper body end portion.

In some embodiments, the flange top surface and the flange bottom surface extend in parallel from the lower body portion at an angle of 55-60° with respect to the central axis.

In some embodiments, the elastomer is selected from polyurethane, butadiene, and nylon. For example, the elastomer is polyurethane having a Shore-A hardness of at least 95.

Another aspect of the present disclosure is a method of installing a turnlock fastener. In one embodiment, the method includes providing a turnlock fastener with a shaft and a fastener head, a panel defining a panel opening, and a vibration isolation assembly with an annular first component and a second component, the second component including (i) a hollow body extending along a central axis and defining a through-opening along the central axis, and (ii) a flange extending radially outward from a lower body end portion, wherein the first component and the second component are made of an elastomeric material and are sized for installation on a shaft of the turnlock fastener; installing the first component on the shaft of the turnlock fastener; installing the fastener shaft through the panel opening so that the first component is between the panel and the fastener head; installing the second component on the shaft with an upper body end portion extending towards the fastener head; installing the shaft into a panel mount including a wire connector; and turning the turnlock fastener to engage the wire connector and draw the panel towards the panel mount.

In some embodiments, the method further comprises selecting the first component of a first elastomer; and selecting the second component of a second elastomer different from the first elastomer.

In some embodiments, the first component and the second component have a Shore-A hardness of at least 95 and are selected from polyurethane, butadiene, or nylon.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

BRIEF DESCRIPTION OF THE DRAWINGS

FIG. 9A illustrates a top perspective view of first and second components of a vibration isolation assembly, in accordance with another embodiment of the present disclosure.

FIG. 9B illustrates a cross-sectional view of the first and second components of FIG. 9A.

FIG. 12 illustrates a flow chart for a method of installing a turnlock fastener, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Figure 1A:
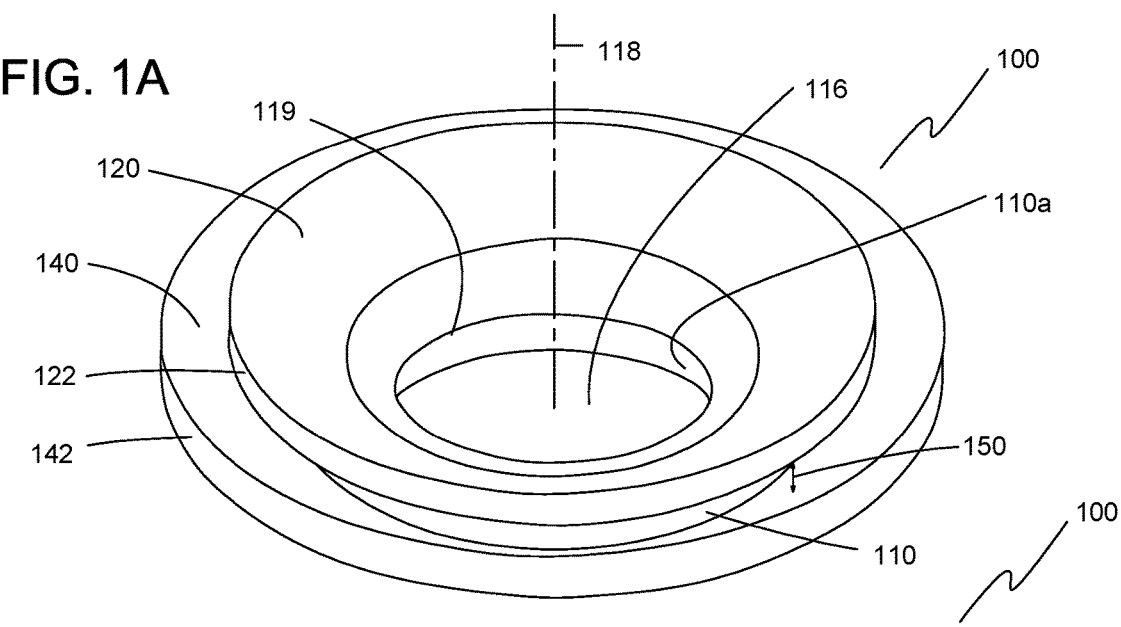
FIGS. 1A-1C illustrate perspective, elevational, and sectional views, respectively, of one embodiment of an elastomeric collar of the present invention configured for a recessed-head fastener.
Figure 1B:
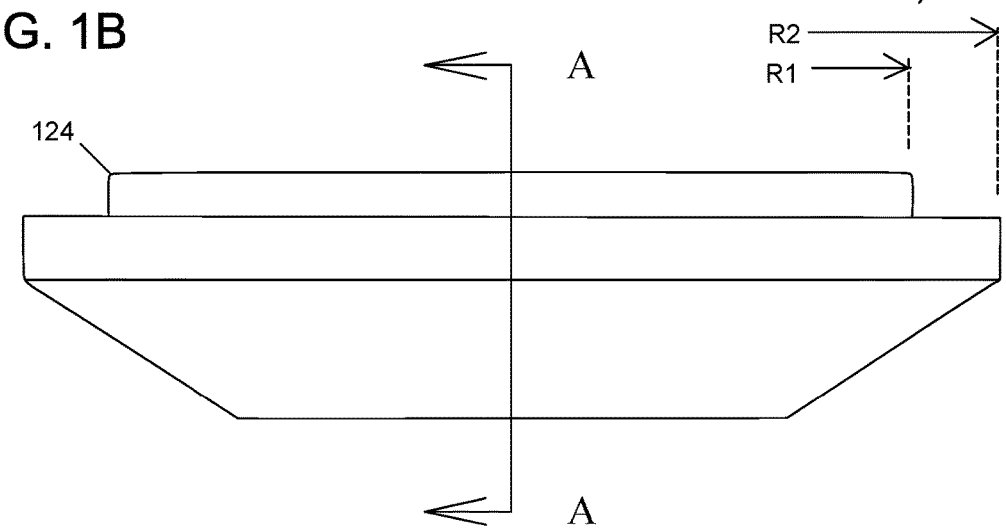
Figure 1C:
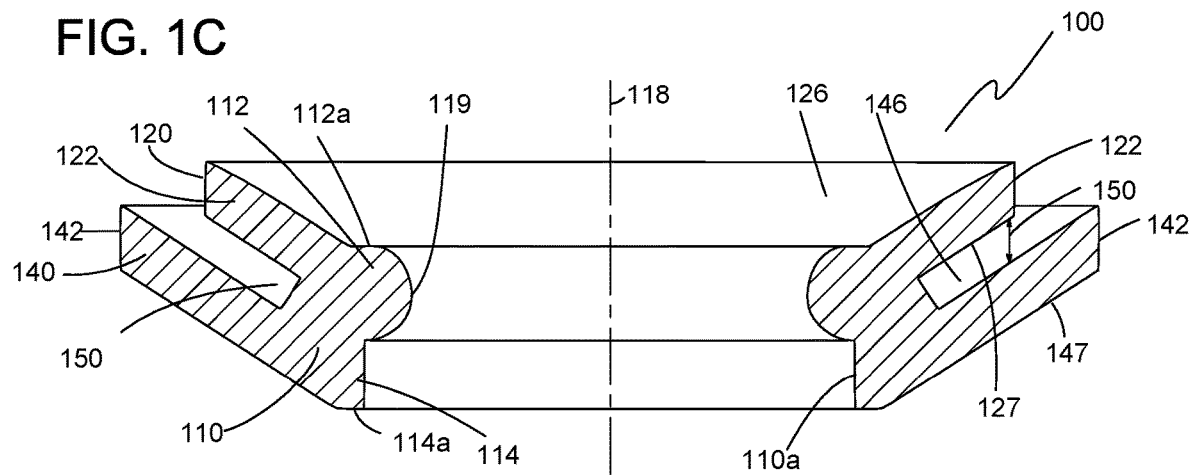
Figure 2A:
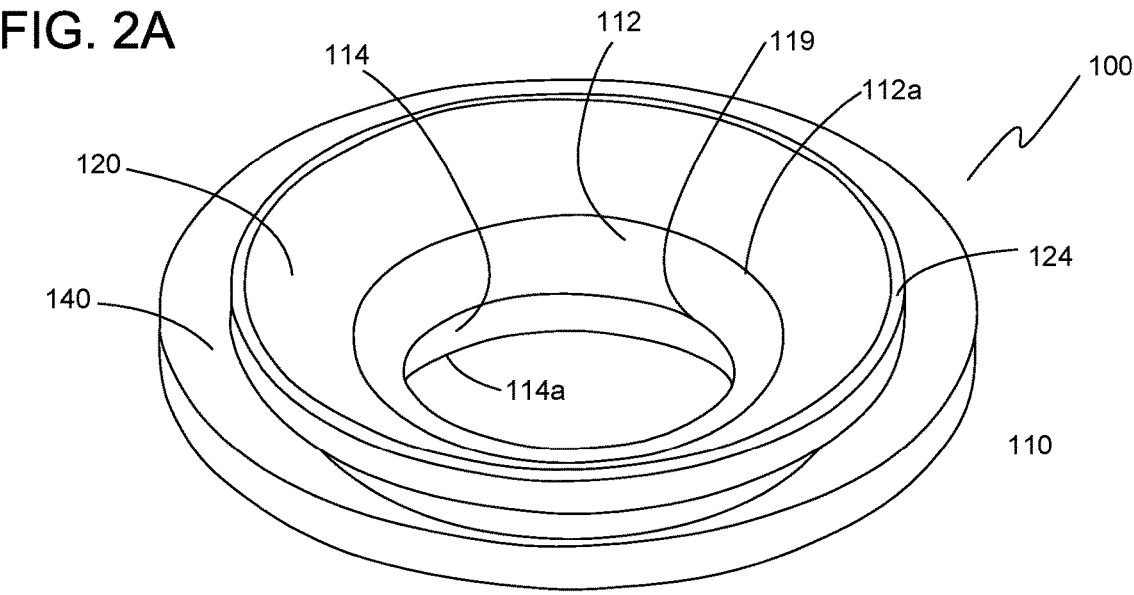
FIGS. 2A-2C illustrate perspective, elevational, and sectional views, respectively, of another embodiment of an elastomeric collar of the present invention showing a rounded rim on the upper flange and configured for a recessed-head fastener.
Figure 2B:
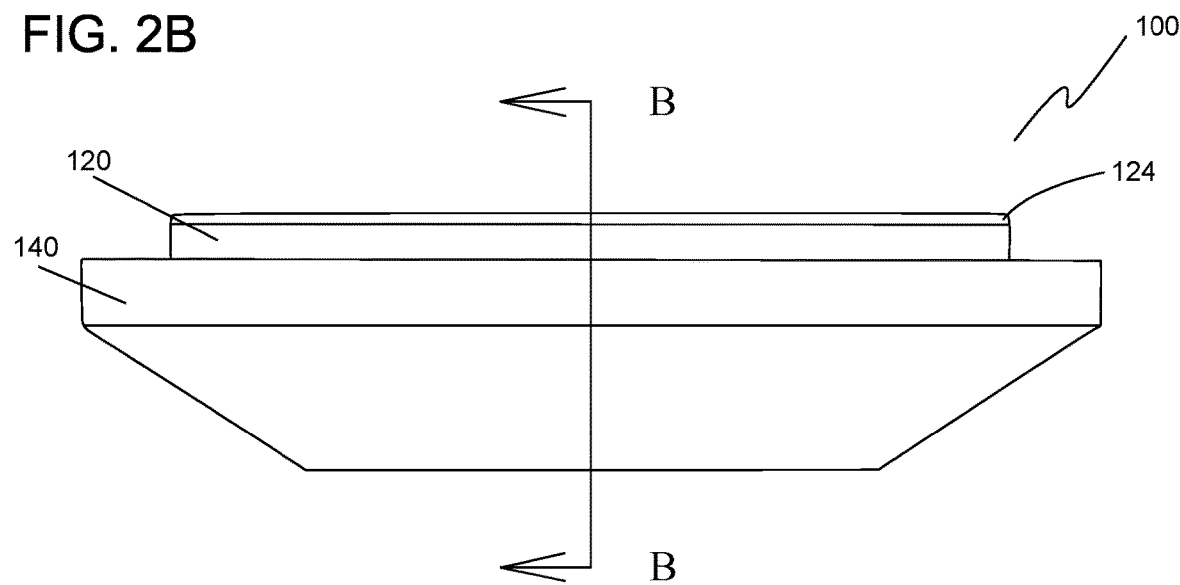
Figure 2C:
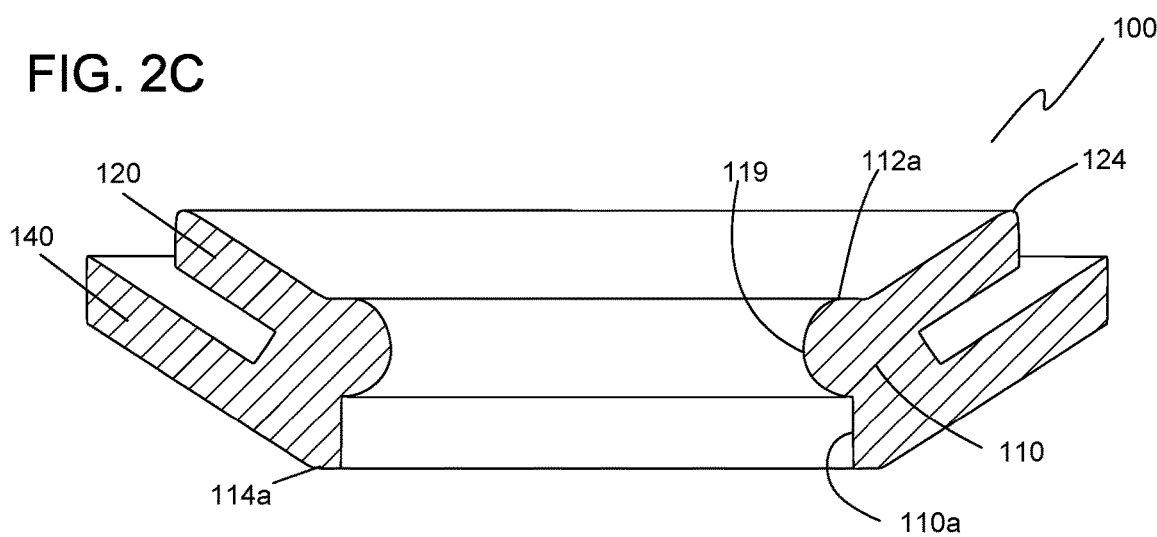

FIGS. 1A, 1B, and 1C illustrate one embodiment of a fastener collar 100 shown in perspective view, side elevational view, and sectional elevation as taken along section line A-A of FIG. 1B, respectively. Collar 100 is made of an elastomer, such as polyurethane, butadiene, or natural rubber. In one embodiment, collar 100 is single, monolithic structure made of polyurethane with a durometer of about 95 A. Other acceptable materials include natural rubber with a durometer of about 60 and butadiene with a durometer of about 40.

Collar 100 includes a hollow shaft portion or body portion 110 having a generally cylindrical shape and extending along a central axis 118 from a first body end portion with a first body end 112a to a second body end portion 114 with a second body end 114a. Body portion 110 defines a central opening 116 through body portion 110 along central axis 118. In one embodiment, central opening 116 has a minimum diameter of 0.315 inch that is sized for a corresponding turnlock fastener 200. In other embodiments, central opening 116 has a minimum diameter of 0.0335 inch or 0.410 inch. Other sizes are acceptable.

A first flange 120 is joined to or continuous with body portion 110 adjacent first body end portion 112 and extends radially outward to a first outer flange end 122. First flange 120 has a first flange top surface 126 and a first flange bottom surface 127 that extend in parallel to first outer flange end 122. A second flange 140 is joined to or continuous with body portion 110 adjacent second body end portion 114 and extends radially outward to a second outer flange end 142. Second flange 140 has a second flange top surface 146 and a second flange bottom surface 147 that extend in parallel to second outer flange end 142. First flange 120 and second flange 140 each generally have the shape of a frustoconical annulus and extend radially outward in a parallel, spaced-apart relationship from body portion 110. In one embodiment, at least two of the first flange top surface 126, first flange bottom surface 127, second flange top surface 146, and second flange bottom surface 147 are inclined with respect to the central axis 118. For example, the first flange bottom surface 127 and the second flange top surface 146 extend substantially in parallel at an angle α with respect to the central axis 118, where the angle α is 55-60°. Other values of angle α are acceptable.

First flange 120 and second flange 140 are separated axially by a gap 150. In one embodiment, gap 150 is substantially constant with increasing radius. In other embodiments, gap 150 increases or decreases with increasing radius from body portion 110. In some embodiments, the gap 150 is sized to correspond to the thickness of the sheet where the collar 100 is installed. In one embodiment, for example, gap 150 is about 0.032 inch, which is a common thickness of aluminum sheet used for aircraft and motorsports. In other embodiments, gap 150 is from 0.025 to 0.063 inch. In yet other embodiments, gap 150 is 0.017 to 0.035 in as consistent with common thicknesses of stainless steel sheet.

In one embodiment, first flange 120 is at last partially nested in second flange 140, where first outer flange end 122 has a first outer radius R1 and second outer flange end 142 has a second outer radius R2 that is greater than R1. In one embodiment, R1 is about 0.032 inch and R2 is about 0.0387 inch. In other embodiments, R1 is equal to or greater than R2.

In one embodiment, such as shown in FIGS. 1A-1C and 2A-2C, first flange 120 and second flange 140 extend at an angle α of about 30-35 degrees to the horizontal (i.e., 55-60 degrees with respect to central axis 118.) In one embodiment, angle α is 33° to the horizontal (i.e., 57° to central axis 118) as consistent with the geometry of some turnlock fasteners with a flat head that is recessed into a panel opening 262 (shown in FIG. 6).

First outer flange end 122 and second outer flange end 142 may be straight or curved. In some embodiments as shown in FIGS. 1A-1C, first outer flange end 122 and second outer flange end 142 are straight and extend parallel or substantially parallel to central axis 118. In some embodiments, first flange 120 has a thickness that is less than a thickness of second flange 140. For example, first outer flange end 122 has a vertical height of about 0.040 inch or thickness of about 0.033 inch as measured perpendicular to first flange top surface 126; second outer flange end 142 has a vertical height of about 0.050 inch or thickness of about 0.042 inch as measured perpendicular to second flange top surface 146. In one embodiment, a first upper rim 124 of first flange 120 is rounded with a radius of curvature of 0.008 inch as shown, for example, in FIGS. 2A-2C.

Body portion 110 defines a rounded annular protrusion 119 (also known as a retaining lip) extending into central opening 116 from inside surface 110a. In one embodiment, annular protrusion starts at or near first body end 112 and curves down with a radius of 0.0375 inch. Accordingly, in one embodiment central opening 116 has a minimum diameter of about 0.315 inch at annular protrusion 119 and about 0.390 inch at inside surface 110a located above or below annular protrusion 119. In some embodiments as shown in FIGS. 1A-1C and 2A-2C, annular protrusion 119 extends axially about 0.075 inch of a total axial distance of 0.131 inch for body portion 110. In other words, annular protrusion 119 extends axially about 57% of the axial height of body portion 110 along inside surface 110a.

Figure 6:
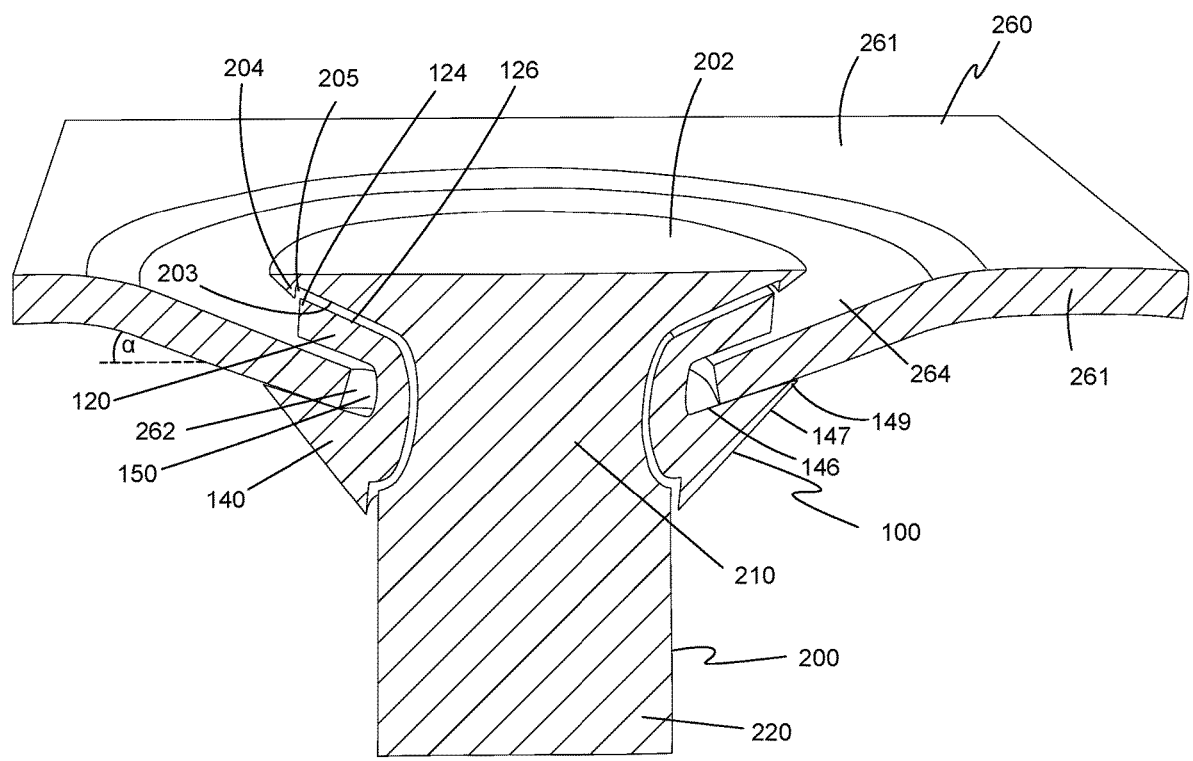
FIG. 6 illustrates a sectional view of one embodiment of a recessed fastener installed through an opening of an outer panel, where an elastomeric collar of the present invention is installed in the opening of the panel.

Annular protrusion 119 is sized and positioned to mate with a narrowed neck 210 on a fastener, such as shown, for example, in FIG. 6. Annular protrusion 119 may be modified, diminished, or omitted, depending on the geometry and type of the particular fastener used. For example, annular protrusion 119 may be omitted when collar 100 is used with a standard screw or bolt, particularly when the standard fastener is seldom or never removed after installation.

Figure 3A:
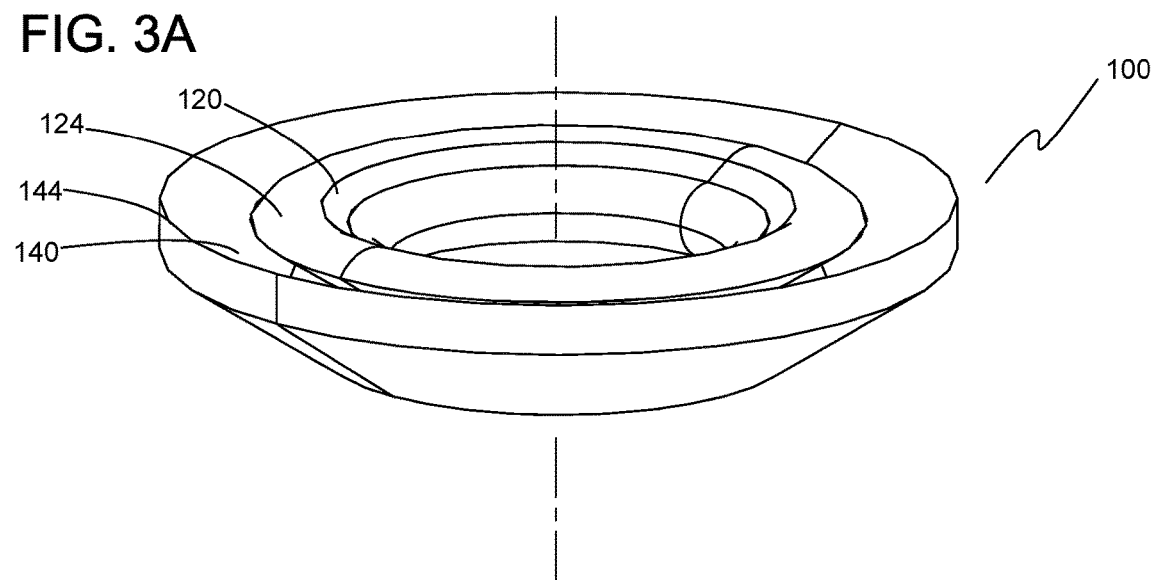
FIGS. 3A-3C illustrate perspective, elevational, and sectional views, respectively, of another embodiment of an elastomeric collar of the present invention showing a further rounded rim on the upper flange and configured for a flat-head or recessed-head fastener.
Figure 3B:
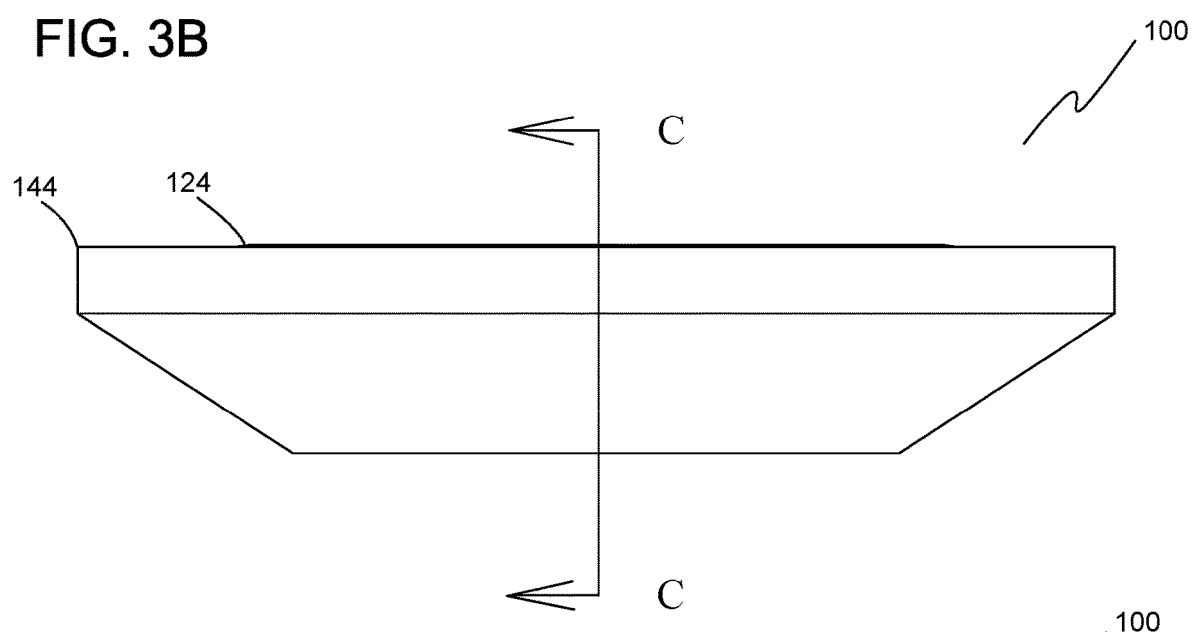
Figure 3C:
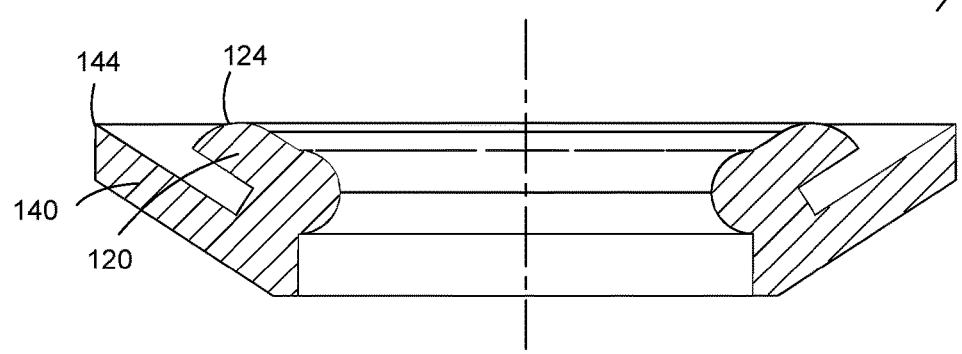

Referring now to FIGS. 3A-3C, another embodiment of collar 100 is shown in a perspective view, a front elevational view, and a sectional view as taken along line C-C of FIG. 3B, respectively. Collar 100 of FIGS. 3A-3C has a rounded first upper rim 124, but with a radius of curvature that first upper rim 124 becomes a domed upper surface. As such, collar 100 is configured for use with flat-head fasteners. For example, first upper rim 124 has a radius of curvature of about 0.050 inch, which is also the approximate thickness of first flange 120. When rounded as such, first upper rim 124 of first flange 120 is substantially flush with second upper rim 144 as illustrated in FIGS. 3B-3C. Such geometry of collar 100 more closely mates with the bottom face of the head 202 of some turnlock fasteners that include a downward protrusion 204 along the edge of the fastener head 202. Collar 100 of FIGS. 1A-1C, 2A-2C, and 3A-3C are particularly suited for turnlock fasteners with a flat, recessed head.

Figure 4A:
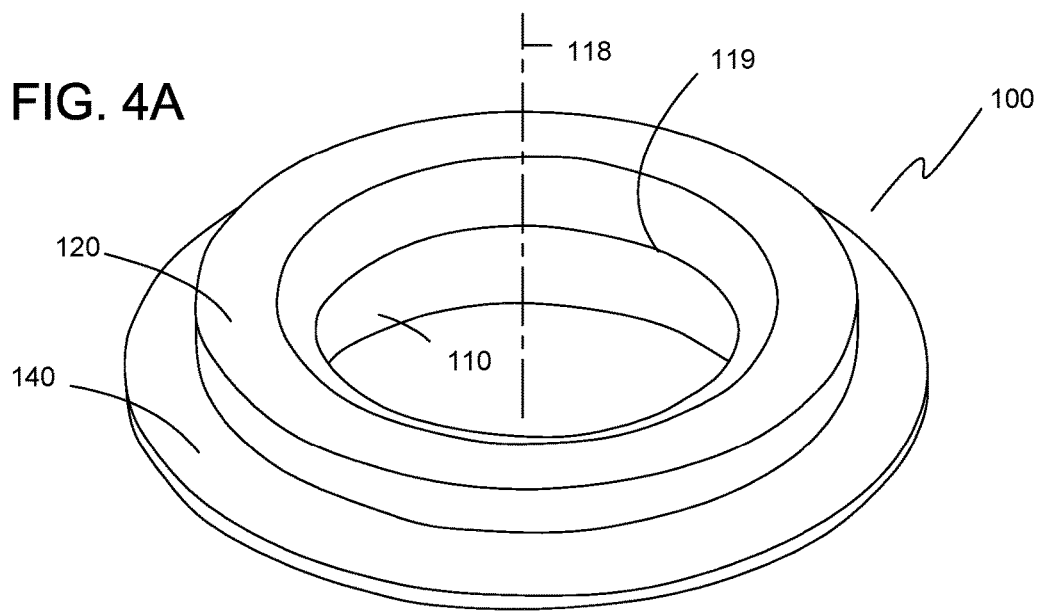
FIGS. 4A-4C illustrate perspective, elevational, and sectional views, respectively, of another embodiment of an elastomeric collar of the present invention configured for a domed-top or button-cap fastener in a non-recessed opening.
Figure 4B:
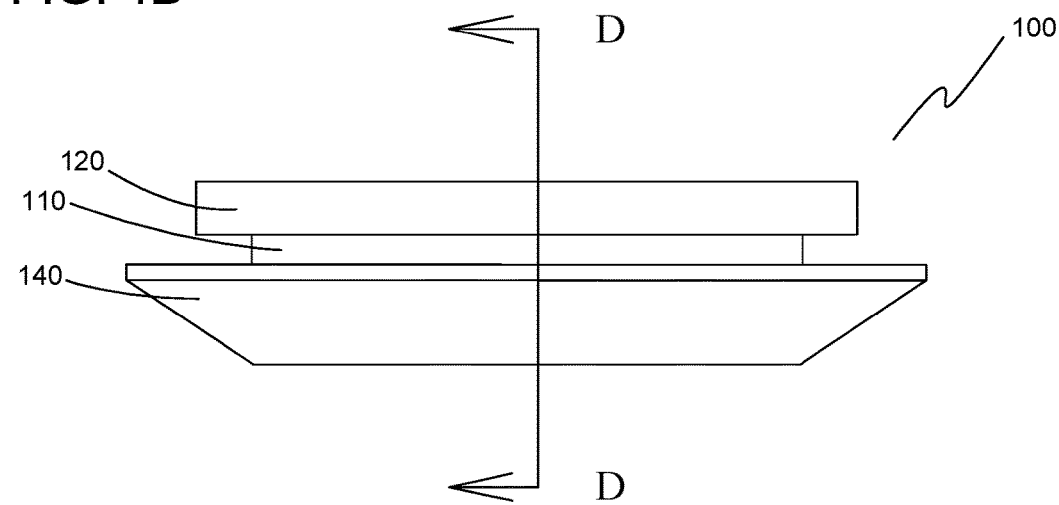
Figure 4C:
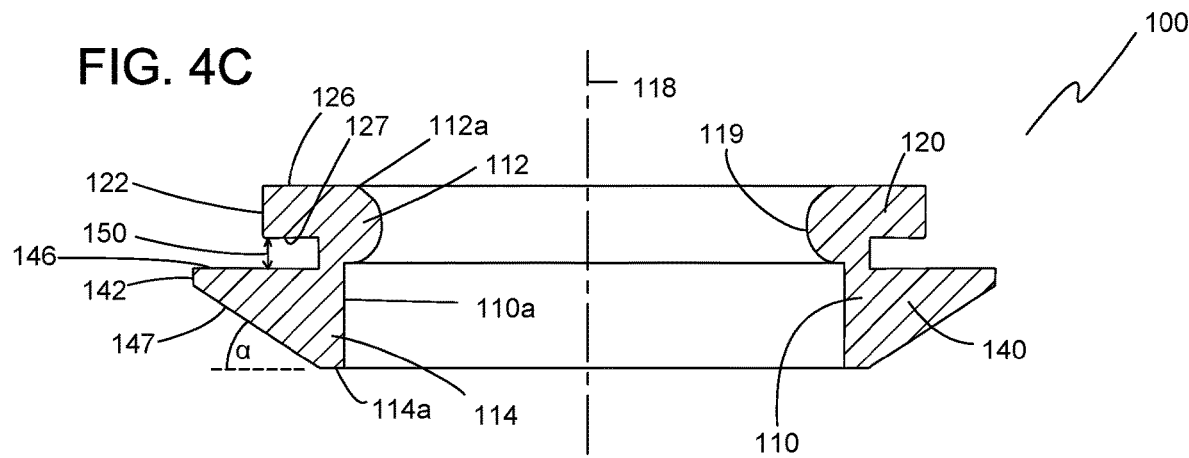

Referring now to FIGS. 4A-4C, another embodiment of collar 100 is shown in a perspective view, a front elevational view, and a sectional view as taken along line D-D of FIG. 4B, respectively. In this embodiment of collar 100, each of the first flange top surface 126, first flange bottom surface 127, and second flange top surface 146 extend radially outward from body portion 110 in a direction substantially perpendicular to central axis 118. Second flange bottom surface 147 is inclined at angle α with respect to central axis 118. Accordingly, first flange 127 has a rectangular profile as shown in FIGS. 4B-4C. Second flange top surface 146 is perpendicular to central axis 118 and second flange bottom surface 147 defines an angle α of 30-35° with the horizontal. Top face 146 and bottom face 147 of second flange 140 extend to second outer flange end 142, which is parallel with central axis 118. Accordingly, second flange has a wedge-shape profile as shown in FIGS. 4B-4C. Bottom face 147 is sloped for convenience to avoid interference with a lower panel or receiver (not shown) but may be either sloped or extend perpendicular to central axis 118 as does top face 146. As such, collar 100 as shown in FIGS. 4A-4C is configured to be used, for example, with a fastener having a domed or button-cap head 202.

In the embodiment shown in FIGS. 4A-4C, annular protrusion 119 begins at first body end 112a and has a rounded or semicircular profile. Annular protrusion 119 extends axially downward along inside surface 110a approximately to second flange top surface 146.

Figure 5A:
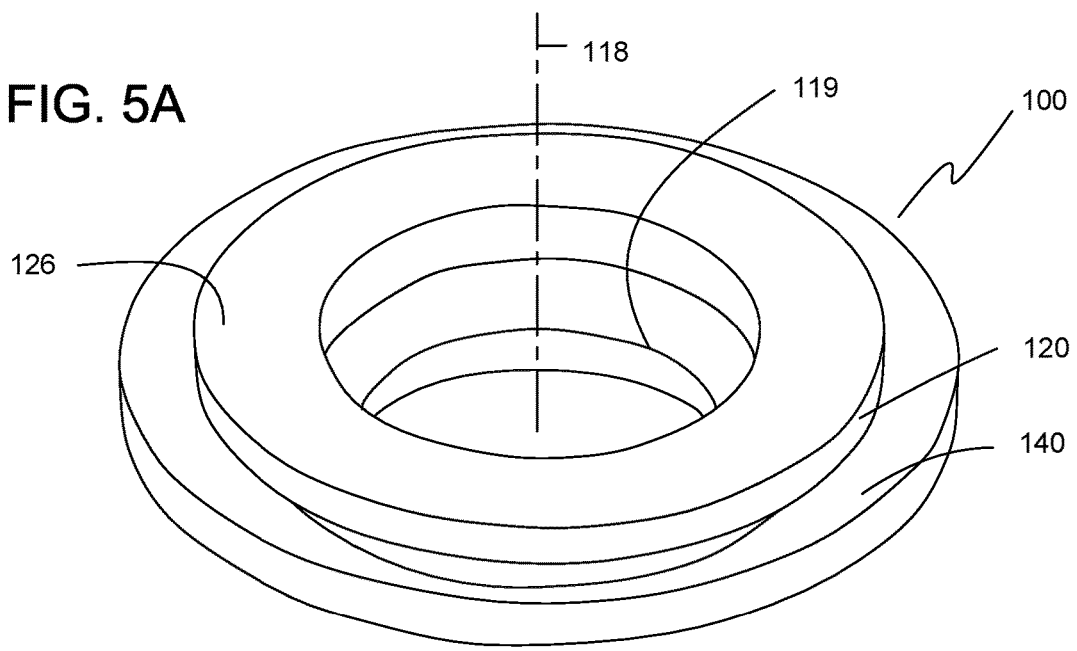
FIGS. 5A-5C illustrate perspective, elevational, and sectional views, respectively, of another embodiment of an elastomeric collar of the present invention configured for a recessed opening and a domed-top fastener.
Figure 5B:
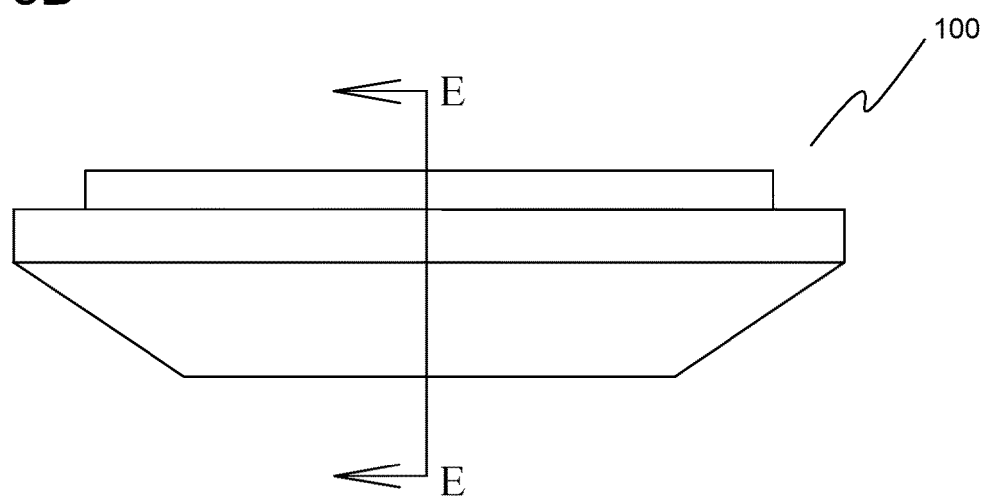
Figure 5C:
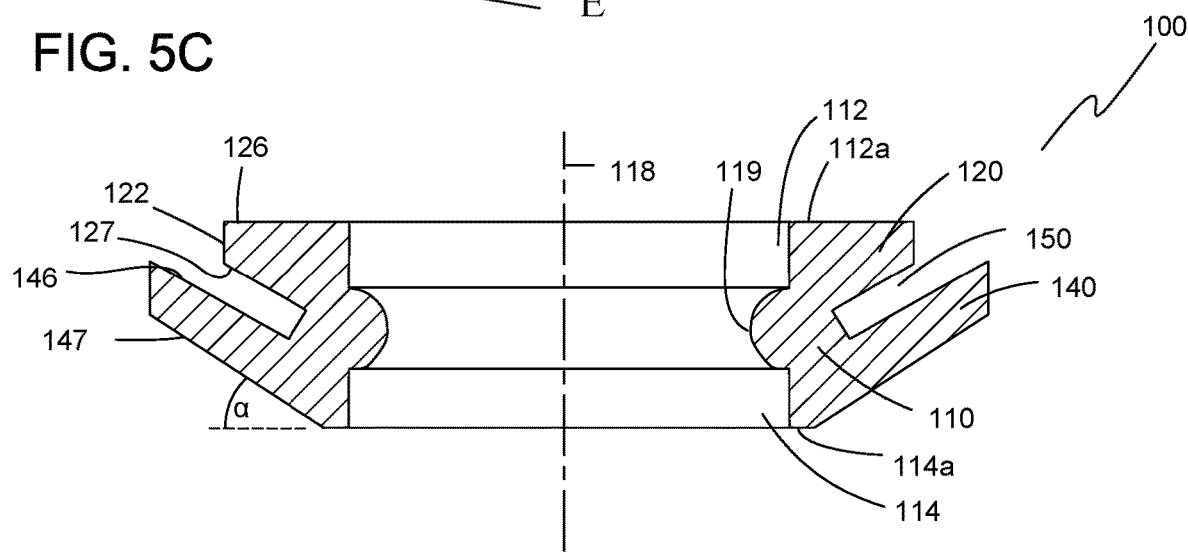

Referring now to FIGS. 5A-5C, another embodiment of collar 100 is shown in a perspective view, a front elevational view, and a sectional view as taken along line E-E of FIG. 5B, respectively. In this embodiment of collar 100, first flange top surface 126 extends substantially perpendicular to central axis 118. First flange bottom surface 127 extends at an angle α of about 50-55° to central axis 118 (30-35° to the horizontal). First flange top surface 126 and first flange bottom surface 127 extend to first outer flange end 122 which is parallel with central axis 118. Accordingly, first flange 127 generally has a wedge-shape profile as shown in FIGS. 5B-5C. Similar to the embodiment of FIGS. 1A-1C, second flange top surface 146 and second flange bottom surface 147 140 extend in parallel from body portion 110 an angle α of 30-35° with the horizontal, preferably 33°.

Second flange top surface is substantially parallel with first flange bottom surface 127 and extend to second outer flange end 142, which is parallel with central axis 118. The inclined second flange bottom surface 127, second flange top surface 146, and first flange bottom surface 127 all define substantially the same angle α. As such, collar 100 of FIGS. 5A-5C is particularly suited for use with countersunk fastener openings and roundhead fasteners. First flange top surface 126 is suited for turnlock fasteners 200 having a flat bottom surface as found on a roundhead fastener. Annular protrusion 119 is approximately centered between first body end 112a (top) and second body end 114a (bottom.)

FIG. 6 illustrates a cross-sectional view of one embodiment of collar 100, fastener 200, and panel 260. Panel 260 is an outer panel and has a panel body 261 with a fastener opening 262 and a countersunk region 264 surrounding fastener opening 262. As shown in FIG. 6, countersunk region 264 slopes downward to fastener opening 262 from the horizontal panel body 261. Fastener 200 is a flathead turnlock fastener with a screw head 202, a narrowed neck 210, and a shaft 220, where neck 210 is between head 202 and shaft 220 and occupies fastener opening 262 when installed.

Collar 100 is similar to the embodiment of FIGS. 1A-1C. One difference, however, is that second flange top surface 146 and second flange bottom surface 147 converge radially to a narrow rim 149 or point 149 rather than extending in parallel to second outer flange end 142. This reduced profile compared to second flange end 142 in FIG. 1C further avoids interference with a lower panel (not shown), which would be positioned below second flange bottom surface 147. First flange top surface 126 of first flange 120 extends along bottom screw head surface 203 of fastener head 202 with first upper rim 124 fitting into a nook 205 defined by lower screw head protrusion 204. First flange 120 and second flange 140 extend from body portion 110 at angle α matching that of countersunk region 264 and bottom screwhead surface 203, which commonly is about 33°. Panel 260 at fastener opening 262 is received in gap 150. Annular protrusion 119 is rounded, sized, and positioned to mate with narrowed neck 210 of fastener 200 with first flange top surface 126 abutting the bottom screwhead surface 203 of the fastener head 202. Inside surface 110a of body portion 110 below annular protrusion 119 has a diameter consistent with that of shaft 220.

In use, collar 100 is preferably installed first in the fastener opening 262 with the panel 260 positioned between first flange 120 and second flange 140. After installing collar 100 in the fastener opening 262, the fastener 200 is then installed through central opening 110 and fastener opening 262. Fastener 200 may be a turnlock fastener or other fastener 200 including a screw, a bolt, a rivet, or other standard or custom fastener. As fastener 200 is tightened, first flange 120 of collar 100 is pressed between fastener head 202 and panel 260 to form a water-tight seal. Therefore, water, fuel, and other liquids do not pass through fastener opening 262 in panel 260. Collar 100 also prevents or greatly reduces wear on panel 260 due to dampening vibration of fastener 200 and panel 260 when installed in fastener opening 262. Being made of an elastomeric material such as polyurethane, collar 100 is very durable and resilient. Collar 100 also has a long service life and withstands UV light and exposure to fuel, oil, water, heat, cold, and other environments without appreciable degradation.

In one example, fastener 200 is a turnlock fastener or rivet that holds a carbon fiber panel to a rigid frame of a race car. Collar 100 installed in the fastener opening 262 as described above greatly reduces wear on the panel that otherwise would occur due to contact with and vibration of fastener 200.

Embodiments of collar 100 discussed above are configured for turnlock fasteners. However, collar 100 of the present invention may be modified for use with rivets, screws, bolts, or other permanent or non-permanent fasteners by adjusting the size, angles, and shape. Similarly, while embodiments of collar 100 are shown and described as having a round shape as viewed from above, other embodiments of first and/or second flange 120, 140 may be oblong, square, rectangular, or other shape. Embodiments of collar 100 can be made according to standard sizes for any fastener 200 and corresponding fastener opening 262 and alternately may be made in custom sizes and shapes or made oversized to cover a worn or damaged fastener opening 262.

Referring now to FIGS. 7-11, components of a vibration isolation assembly 300 are shown. In one embodiment, the vibration isolation assembly 300 includes a first component 310 and a second component 350. The first and second components 310, 350 can be separately installed on a turnlock fastener 200 or the like during installation of the fastener 200. The first component 310 is configured to be installed against the bottom side of a fastener head 202 and generally has an annular shape, such as a flat annulus or frustoconical annulus. The first component 310 may also be referred to as a cowl isolator. The second component 350 is configured to be installed on the fastener shaft 220 after the fastener 200 is installed through a panel opening such that the second component 350 abuts the bottom (inside) face of the panel with the body extending into or through the opening in the panel. The second component 350 has an annular flange extending from the bottom portion of a hollow cylindrical body. For example, the second component 350 is like the combination of second flange 140 and body portion 110 of the collar 100 discussed above. The first and second components 310, 350 can be made of an elastomeric material (e.g., polyurethane, butadiene, natural rubber, nylon, etc.) and can have the geometries and configurations variously described above for the first flange 120, second flange 140, and body 110. Examples of selected embodiments are discussed in more detail below.

Figure 7A:
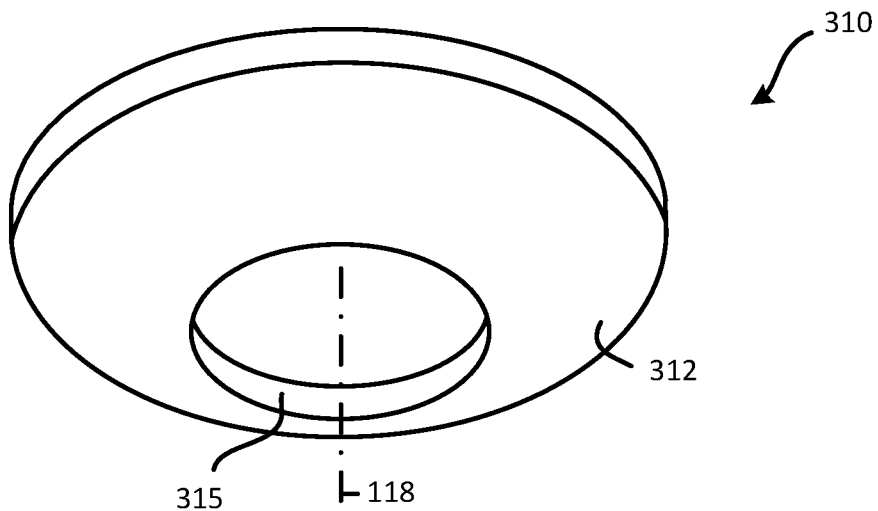
FIG. 7A illustrates a bottom perspective view of a first component of a vibration isolation assembly, in accordance with an embodiment of the present disclosure.
Figure 7B:
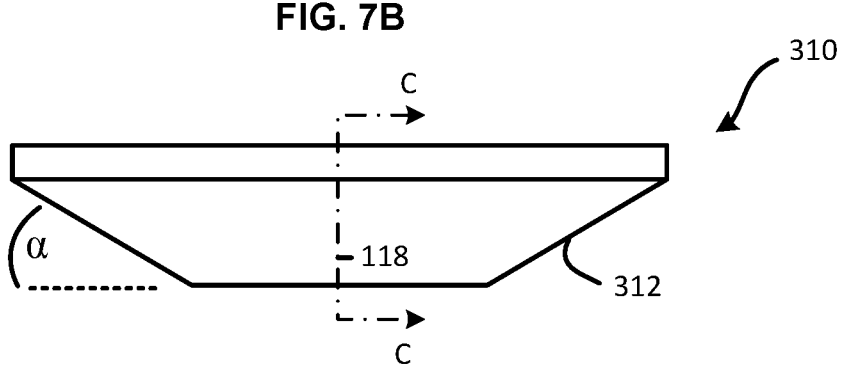
FIG. 7B illustrates a side view of the first component of FIG. 7A.
Figure 7C:
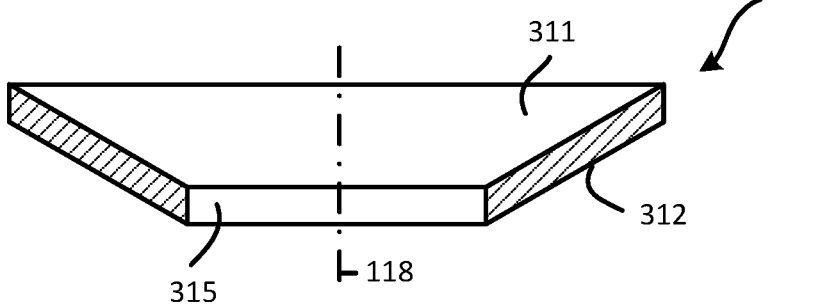
FIG. 7C illustrates a cross-sectional view of the first component as taken along line C-C of FIG. 7B.

FIGS. 7A-7C illustrate various views of first component 310, in accordance with one embodiment. FIG. 7A is a bottom perspective view, FIG. 7B is a side view, and FIG. 7C is a cross-sectional view taken along line C-C of FIG. 7B. In this example, the first component 310 has an annular shape with a frustoconical profile. For example, the first component 310 has a top surface 311 and bottom surface 312 that extend in parallel upward and outward from a central opening 315 at an angle α of 20-45° to the horizontal, such as about 25-40° or 30-35°. The first component 310 can have numerous other configurations, such as described above for first flange 120.

Figure 8A:
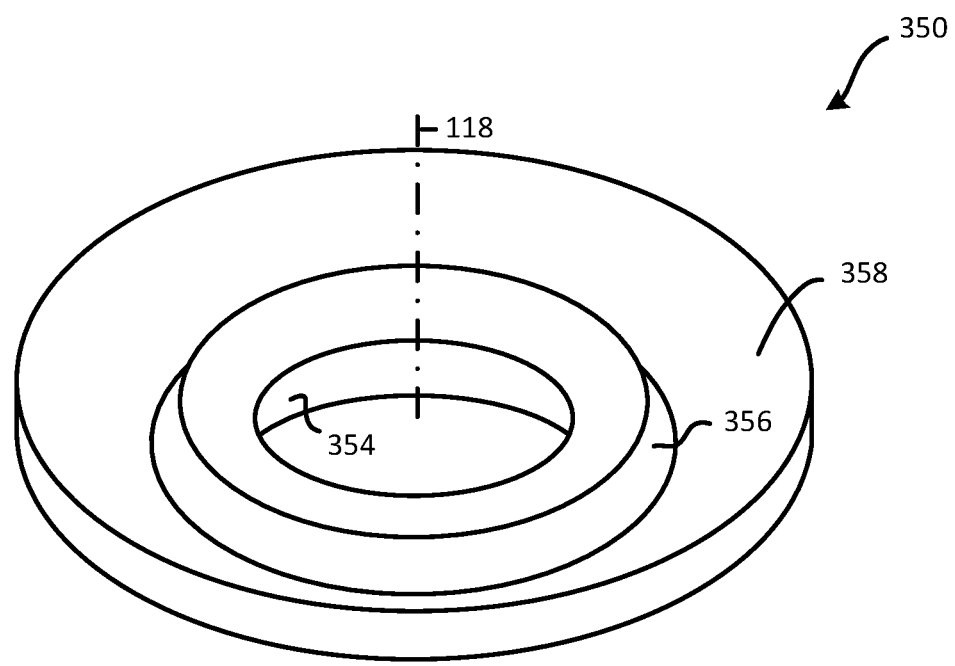
FIG. 8A illustrates a top perspective view of a second component a vibration isolation assembly, in accordance with an embodiment of the present disclosure.
Figure 8B:
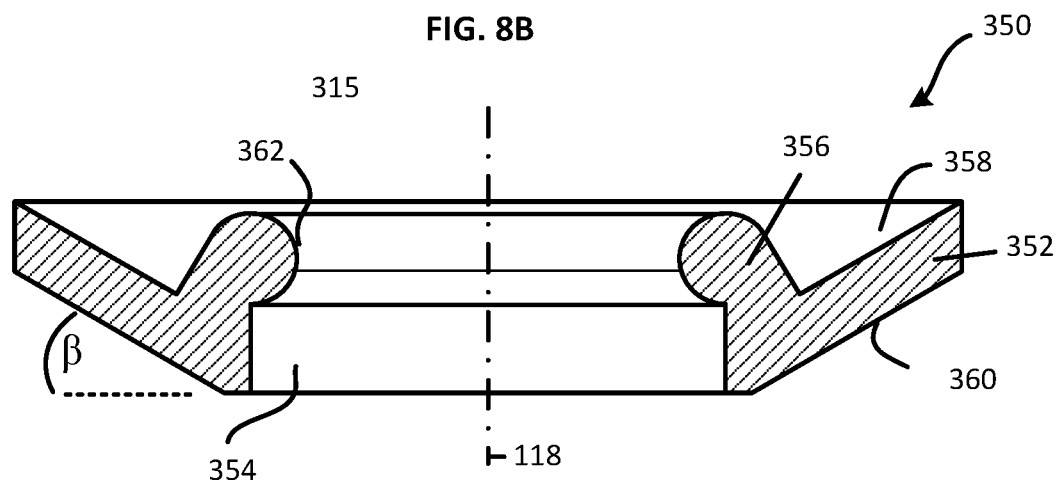
FIG. 8B illustrates a cross-sectional view of the second component of FIG. 8A.

FIGS. 8A-8B illustrates a top perspective view and a cross-sectional view, respectively, of a second component 350 of a vibration isolation assembly 300, in accordance with one embodiment. In this example, the second component 350 includes a flange portion 352 defining a central opening 354 sized for receiving the shaft of a turnlock fastener. A generally cylindrical body portion 356 connects to the flange portion 352 at the central opening 354 and extends upward from the flange portion 352. In this example, the flange portion 352 has a top surface 358 and bottom surface 360 that extend in parallel at an angle β with respect to the horizontal. In some embodiments, angle β is the same as angle α of the first component 310, but this is not required. Angle β can be from 20-45°, such as 25-40° or 30-35°, for example. In some embodiments, body portion 356 includes an annular protrusion 362 that extends radially inward relative to the central opening 354. In some embodiments, the annular protrusion 362 has a rounded profile sized and shaped to fit into a corresponding recess on the shaft of a fastener (e.g., shown in FIG. 6). When installed, the top surface of the body portion 356 may contact the first component 310. The second component 350 can have numerous other configurations, such as described above for second flange 140 and body portion 110 of collar 100.

Referring now to FIGS. 9A and 9B, first and second components 310, 350 of vibration dampening assembly 300 are shown in accordance with another embodiment. FIG. 9A illustrates a top perspective view of first and second components 310, 350, and FIG. 9B illustrates a cross-sectional view of first and second components 310, 350. In this example, the first component 310 has a shape of a planar annulus. Top and bottom surfaces 311, 312 extend in parallel and are substantially perpendicular (±3°) to the central axis 118. A radially inside face 317, which defines the central opening 315, has a rounded profile. In one embodiment, the radially inside face 317 has a semicircular profile. The radially inside face 317 can be configured, for example, to mate with and be received in a corresponding annular slot or recess in the shaft of a turnlock fastener 200.

The second component 350 has a cylindrical body portion 356 that defines the central opening 315 and extends upward from the top surface 358 of the flange portion 352. In this example, the top surface 358 extends radially outward from the body portion 356 such that the top surface 358 and central axis 118 are substantially perpendicular (±3°). The bottom surface 360 defines an angle β with the horizontal from 20-60°, including 30-50° and 25-40°.

Figure 10:
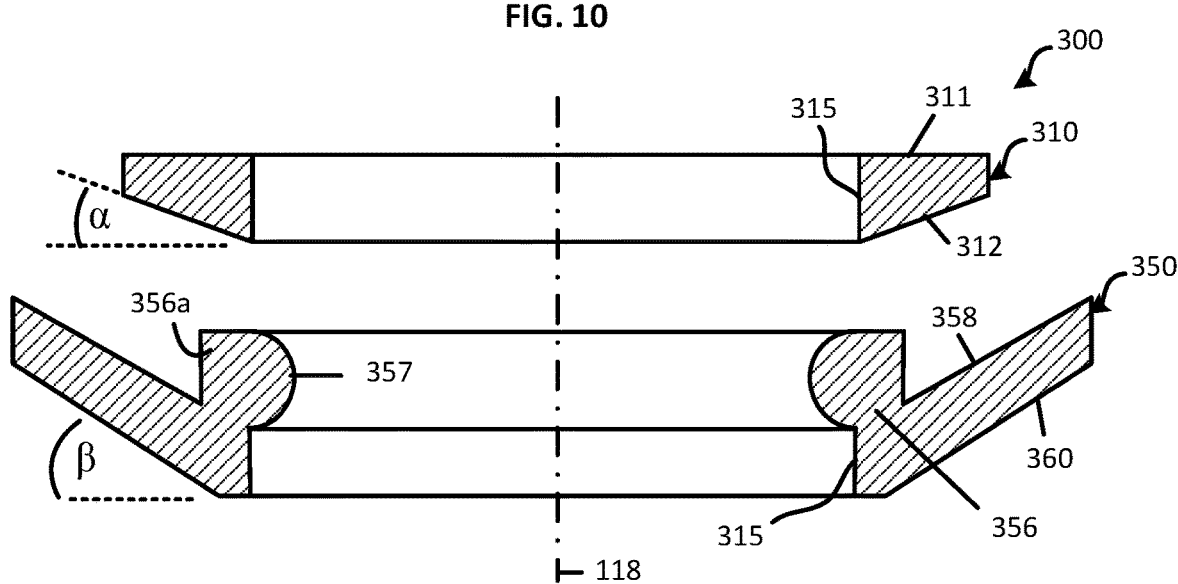
FIG. 10 illustrates a cross-sectional view of first and second components of a vibration isolation assembly, in accordance with another embodiment of the present disclosure.

FIG. 10 illustrates a cross-sectional view of first component 310 and second component 350, in accordance with another embodiment. In this example, the first component 310 has a generally planar and annular shape. Top surface 311 extends radially outward from the central opening 315 and is substantially perpendicular (±3°) to the central axis 118. The bottom surface 312 defines an angle α from 20-40° with the horizontal, including 15-25° and 20-35°.

The second component 350 has a body portion 356 defining the central opening 315 and extending upward from the top surface 358. The upper body portion 356a includes a rounded protrusion 357 extending radially inward into the central opening 315 toward the central axis 118. As noted above, the protrusion 357 can be sized and configured to be received in a circumferential groove in a fastener shaft 220. In this example, the top surface 358 and bottom surface 360 of the second component 350 extend substantially in parallel from the body portion 356 such that the top and bottom surfaces 358, 360 define an angle β with the horizontal from 20-40°, including 15-25° and 20-35°. In this example, the horizontal is perpendicular to the central axis 118.

Figure 11A:
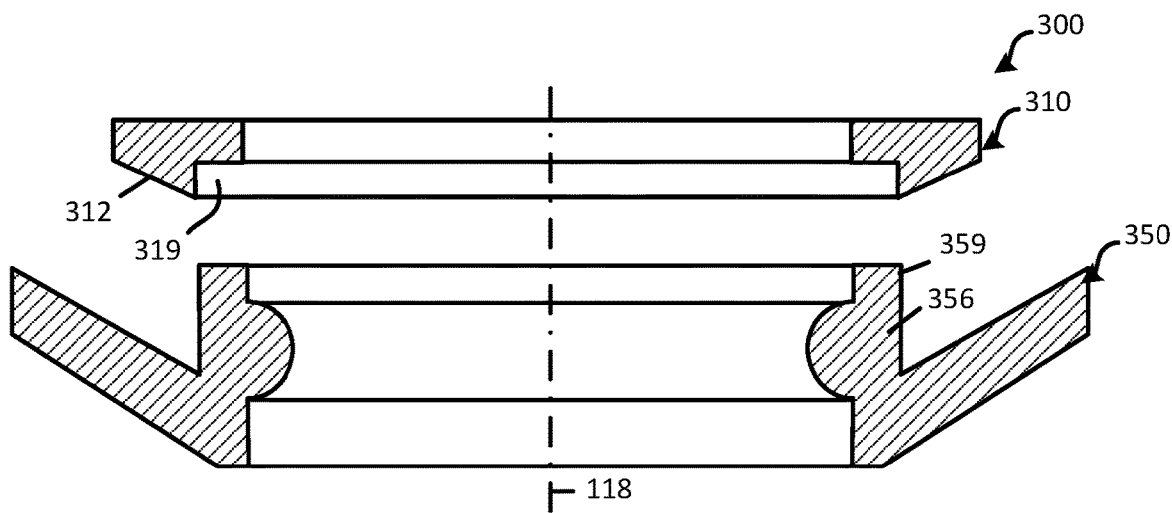
FIG. 11A illustrates a cross-sectional view of first and second components of a vibration isolation assembly shown separated, in accordance with another embodiment of the present disclosure.
Figure 11B:
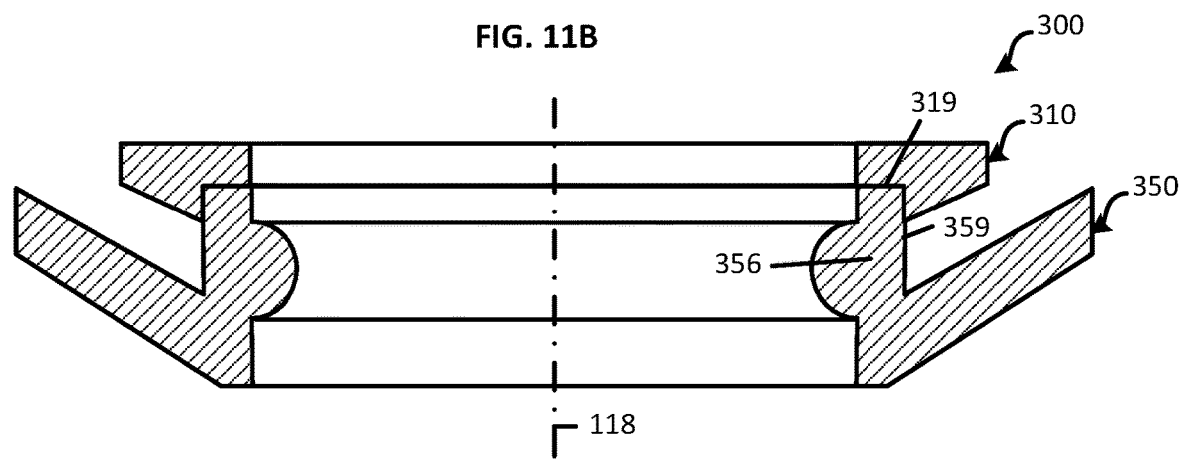
FIG. 11B illustrates the first and second components of FIG. 11A shown assembled in overlapping contact with one another, in accordance with one embodiment.

FIGS. 11A and 11B illustrate cross-sectional views of a vibration isolation assembly 300 having first and second components 310, 350 configured to form a slip fit when assembled, in accordance with another embodiment. FIG. 11A shows the first and second components 310, 350 separated and FIG. 11B shows the first and second components 310, 350 engaging one another with a slip fit. Although not illustrated, a snap fit could similarly be employed between the first and second components 310, 350. Note that assembly 300 with a slip fit or snap fit between the components is not limited to the geometry shown for the first and second components 310, 350 and any embodiments of a vibration dampening assembly 300 discussed above can be configured as such.

In this example, a bottom surface 312 of the first component 310 defines a recess 319 that is sized and configured to receive and engage the body portion 356 of the second component 350. The recess 319 can be a circumferential rabbet, groove, slot, or the like. The body portion 356 has an outside surface 359 that is sized to fit into the recess 319 of the first component 310. This example uses cylindrical surfaces on the first component 310 and the second component 350 that are sized to fit together in sliding engagement, such as the outside surface 359 sliding in contact with the recess 319. In other embodiments, the slip may employ a circular tongue-and-groove, posts and post holes, or other slip-fit geometry, as will be appreciated. Further, surfaces of the slip fit can be configured for a snap fit, such as having a circumferential groove in the recess 319 and a corresponding circumferential rib or protrusion on the outside surface 359 of the body portion 356, or vice versa.

When assembled, such as shown in FIG. 11B, the body portion 356 of the second component 350 is slidably received in the recess 319. In some embodiments, the slip fit between the first and second components 310, 350 is configured with sufficient friction or interference that the components remain engaged and coupled to one another until pulled apart by the user or some other force other than gravity.

FIG. 12 illustrates a method 400 of installing a turnlock fastener, in accordance with some embodiments. Method 400 begins by providing 410 a panel to be installed, a turnlock fastener, and a vibration isolator. In one embodiment, the vibration isolator is an assembly that includes a first component having an annular body with a first top surface and a first bottom surface, where the annular body defines a central opening sized to receive a shaft of the turnlock fastener. The assembly also includes a second component having a hollow cylindrical body portion extending along a central axis and defining a through-opening along the central axis. The through-opening is sized to receive the shaft of the turnlock fastener. The body has an upper body end portion and a lower body end portion. An annular flange extends radially outward from the lower body end portion and has a flange top surface and a flange bottom surface. In one embodiment, the flange bottom surface and the flange top surface each extend radially upward and outward from the body portion generally in parallel at an angle of 45-70° with respect to the central axis. Both the first component and the second component are made of an elastomer having a durometer of at least 40 A, such as polyurethane, butadiene, or nylon. Note that the first component and the second component can be made of the same materials, different materials, and/or materials of the same or different durometers. Numerous variations and embodiments will be apparent in light of the present disclosure.

The panel can be an aircraft cowling, an automotive panel, a refrigeration panel, or an appliance panel, to name a few examples. In many cases, the panel is made of metal, but can be made of other materials, as will be appreciated.

The turnlock fastener can have any suitable configuration, including a recessed head, pan head, a domed head, a head that is slotted or otherwise configured to be turned with a screwdriver or similar tool, or may include a ring for manually turning the fastener. Examples of some turnlock fasteners include fasteners made by Dzus, Camloc, and Airloc.

Figure 13A:
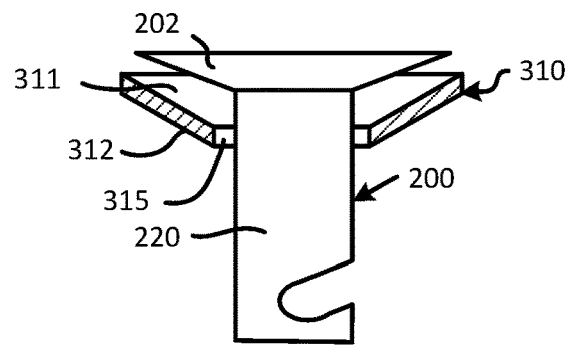
FIGS. 13A-13D illustrate a turnlock fastener and vibration isolation assembly in various stages of the method of installation of FIG. 12, in accordance with some embodiments of the present disclosure.

Method 400 continues with installing 420 the first component on the turnlock fastener. For example, the shaft of the fastener is inserted through the central opening of the first component and the adjusted so that the first component is adjacent the bottom surface of the fastener head. FIG. 13A illustrates a cross-sectional view of a turnlock fastener 200 with the first component 310 installed on the shaft 220, in accordance with one embodiment. Note that in this example, the top and bottom surfaces 311, 312 of the first component 310 extend upward and outward from the central opening 315 at an angle of about 20-40° with respect to the horizontal, and generally consistent with the bottom surface of the fastener head 202.

Figure 13B:
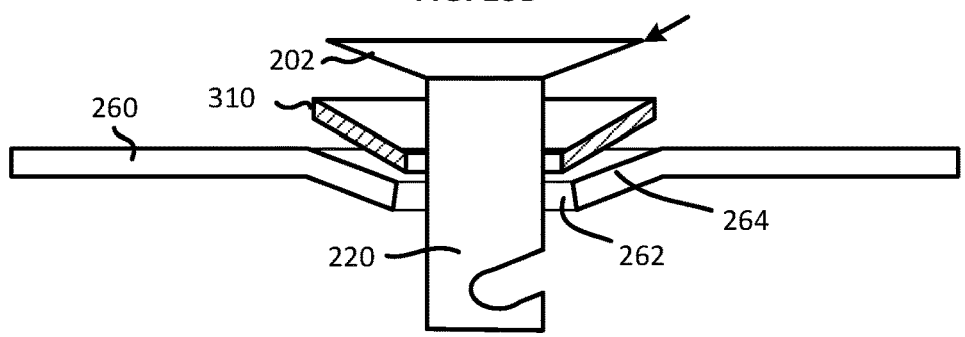

Method 400 continues with installing 430 the shaft of the turnlock fastener through the panel opening so that the first component is between the fastener head and the panel. FIG. 13B illustrates a cross-sectional view of the turnlock fastener 200, first component 310, and panel 260, in accordance with one embodiment. The shaft 220 of the turnlock fastener 200 extends through the panel opening 262 with the first component 310 between the panel 260 and the fastener head 202. In some embodiments, the panel opening 262 is surrounded by a countersunk region 264, such as shown in FIG. 13B.

Figure 13C:
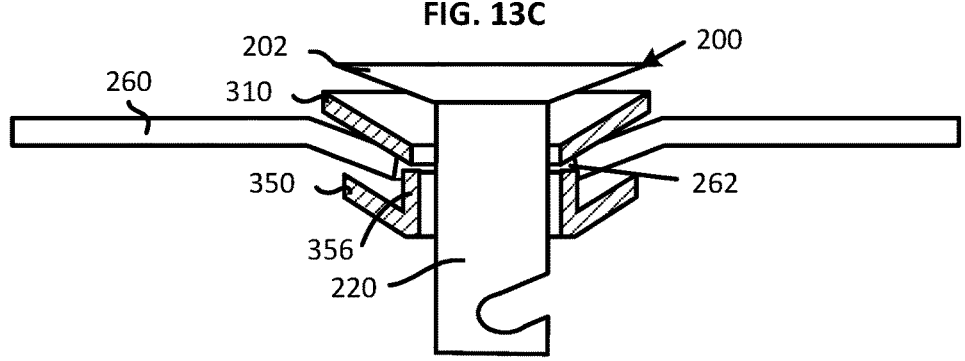

Method 400 continues with installing 440 the second component on the shaft of the turnlock fastener 200 with the upper body end portion extending towards or positioned adjacent the first component 310. Installing 440 the second component may include advancing the second component along the shaft so that the body portion extends into or through the panel opening. Optionally, the upper body portion abuts the first component when the second component is installed on the fastener shaft. FIG. 13C illustrates a cross-sectional view showing the fastener 200, first component 310, second component 350, and panel 260, in accordance with one embodiment. In this example, the second component 350 is installed on the shaft 220 with the body portion 356 extending upward along the shaft 220 towards the fastener head 202 and adjacent the panel opening 262.

Figure 13D:
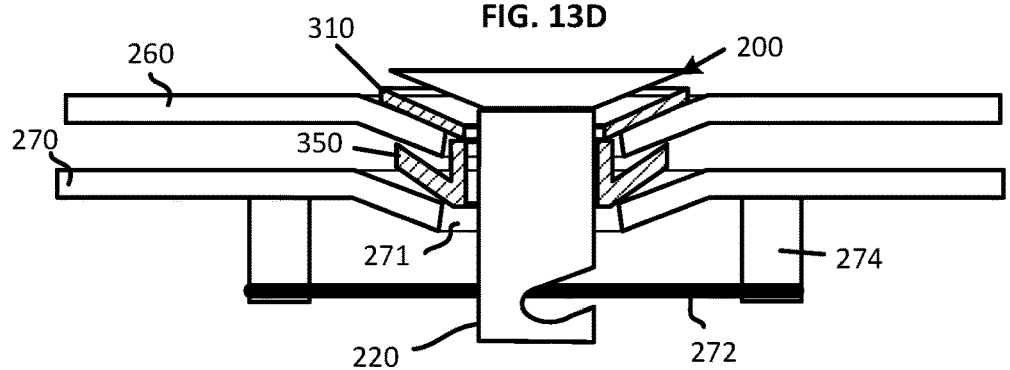

Method 400 continues with completing 450 installation of the panel, which may include placing the panel and fastener against a second panel or panel mount equipped with a wire connector of the turnlock fastener. Completing 450 installation may further include turning the fastener to engage the wire connector and draw the panel towards the second panel or panel mount. FIG. 13D illustrates a cross-sectional view showing the panel 260 installed against a second panel 270. In this example, the second panel 270 defines a second panel opening 271 and includes a wire connector 272 connected between posts 274. The fastener shaft 220 extends through the second panel opening 271 and is positioned to engage the wire connector 272. The wire connector 272 similarly can be part of a panel mount for a turnlock fastener, as will be appreciated. Rotating the fastener 220 draws the panel 260 and second panel 270 towards each other with the second component 350 between the panels 260, 270.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

I claim:

1. A vibration isolation assembly for use with a turnlock fastener, the assembly comprising:
    a first component of a first elastomer, the first component comprising an annular body with a first top surface and a first bottom surface, the annular body defining a central opening sized for a shaft of a turnlock fastener; and
    a second component of a second elastomer, the second component including
        a hollow cylindrical body portion extending along a central axis and defining a through-opening along the central axis and sized for the shaft of the turnlock fastener, the body having an upper body end portion and a lower body end portion; and
        an annular flange continuous with and extending radially outward from the lower body end portion, the annular flange having a flange top surface and a flange bottom surface, wherein the flange bottom surface and the flange top surface each extend radially outward from the body portion in parallel at an angle of 45-70° with respect to the central axis;
    wherein the first elastomer and the second elastomer each have a durometer of at least 40 A, and wherein the first component and the second component are sized for installation on the shaft of the turnlock fastener.

2. The assembly of claim 1 further comprising:
    an annular protrusion extending radially inward from an inside surface of the body portion.

3. The assembly of claim 2, wherein the annular protrusion is located on the upper body end portion.

4. The assembly of claim 1 wherein the body portion has an axial height from 0.2 to 0.6 inch.

5. The assembly of claim 1, wherein the durometer is at least 95 A.

6. The assembly of claim 1, wherein the first elastomer and the second elastomer are compositionally distinct.

7. The assembly of claim 1, wherein the first elastomer has a first durometer and the second elastomer has a second durometer different from the first durometer.

8. The assembly of claim 1, wherein a radially inside surface of the first component has a rounded profile.

9. The assembly of claim 1, wherein the first top surface and the first bottom surface each define an angle of 50-70 degrees with an axis of the central opening.

10. The assembly of claim 9, wherein the angle is 55-60°.

11. The assembly of claim 1, wherein the upper body end portion of the second component is sized and constructed for a slip fit with the first component.

12. The assembly of claim 1, wherein the upper body end portion of the second component is sized and constructed for a snap fit with the first component.

13. A vibration isolator for use with a turnlock fastener, the isolator comprising:
 a body generally having a hollow cylindrical shape extending along a central axis and defining a through-opening along the central axis, the body having an upper body end portion and a lower body end portion, the through-opening sized to receive a shaft of a turnlock fastener; and
 an annular flange extending radially outward from the lower body end portion, the annular flange having a flange top surface and a flange bottom surface, wherein the flange bottom surface and the flange top surface extend generally in parallel upward and radially outward from the lower body end portion at an angle from 50 to 70° with respect to the central axis;
 wherein the body, the annular protrusion, and the annular flange comprise a single monolithic structure made of an elastomer having a Shore-A hardness of at least 60.

14. The vibration isolator of claim 13, wherein the body includes an annular protrusion with a rounded profile extending radially inward from an inside of the upper body end portion.

15. The vibration isolator of claim 13, wherein the flange top surface and the flange bottom surface extend in parallel from the lower body portion at an angle of 55-60° with respect to the central axis.

16. The vibration isolator of claim 13, wherein the elastomer is selected from polyurethane, butadiene, and nylon.

17. The vibration isolator of claim 16, wherein the elastomer is polyurethane having a Shore-A hardness of at least 95.

18. A method of installing a turnlock fastener, the method comprising:
 providing a turnlock fastener with a shaft and a fastener head, a panel defining a panel opening, and a vibration isolation assembly with an annular first component and a second component, the second component including (i) a hollow body extending along a central axis and defining a through-opening along the central axis, and (ii) a flange extending radially outward from a lower body end portion, wherein the first component and the second component are made of an elastomeric material and are sized for installation on a shaft of the turnlock fastener;
 installing the first component on the shaft of the turnlock fastener;
 installing the fastener shaft through the panel opening so that the first component is between the panel and the fastener head;
 installing the second component on the shaft with an upper body end portion extending towards the fastener head;
 installing the shaft into a panel mount including a wire connector; and
 turning the turnlock fastener to engage the wire connector and draw the panel towards the panel mount.

19. The method of claim 18, further comprising:
 selecting the first component of a first elastomer; and
 selecting the second component of a second elastomer different from the first elastomer.

20. The method of claim 19 wherein the first component and the second component have a Shore-A hardness of at least 95 and are selected from polyurethane, butadiene, or nylon.

* * * * *